United States Patent [19]

Tsunashima

[11] Patent Number: 5,631,706
[45] Date of Patent: May 20, 1997

[54] CONVERTER AND METHOD FOR CONVERTING VIDEO SIGNALS OF INTERLACE FORMAT TO VIDEO SIGNALS OF PROGRESSIVE FORMAT

[75] Inventor: Kenji Tsunashima, Somerset, N.J.

[73] Assignee: Mitsubishi Consumer Electronics America, Inc., Somerset, N.J.

[21] Appl. No.: 476,909

[22] Filed: Jun. 7, 1995

[51] Int. Cl.$^6$ .................................................. H04N 7/01
[52] U.S. Cl. ........................................ 348/452; 348/910
[58] Field of Search .................................... 348/448, 451, 348/452, 910; H04N 7/01

[56] References Cited

U.S. PATENT DOCUMENTS 5,025,495  6/1991  Avis ............................................ 348/451
5,446,497  8/1995  Keating et al. ........................... 348/452

OTHER PUBLICATIONS

N.J. Fliege, Multirate Digital Signal Processing, 1994, pp. 1–36.

*Primary Examiner*—Victor R. Kostak

[57] ABSTRACT

A converter for converting video signals of an interlace format to video signals of a progressive format includes an intra-field converter and an adaptive temporal filter. The intra-field converter intra-field converts a video signal of the interlace format into a video signal of the progressive format. The adaptive temporal filter temporally filters the video signal of the progressive format such that as a degree of image movement in images represented by said video signal of said progressive format increases, a lesser degree of temporal filtering is performed.

46 Claims, 5 Drawing Sheets

CONVERTER AND METHOD FOR CONVERTING VIDEO SIGNALS OF INTERLACE FORMAT TO VIDEO SIGNALS OF PROGRESSIVE FORMAT

BACKGROUND OF THE INVENTION

1. Field of the Invention

The present invention relates to a converter and method for converting video signals of interlace format to video signals of progressive format.

2. Description of the Related Art

Conventional display devices, such as television receivers, for displaying broadcast video signals receive and display video signals of the interlace format. In the interlace format, a frame is divided into two fields, and includes, for example, 1920×540 pixels per field. The first field, the even field, includes even numbered lines of the frame. The second field, the odd field, includes odd numbered lines of the frame. In the interlace format, the odd field and then the even field are transmitted to transmit a frame of a video signal.

Conventional display devices for use with, for example, personal computers display video signals of the progressive format which includes, for example, 1280×720 pixels per frame. In the progressive format the even numbered lines and odd numbered lines are not divided into two separate fields. Instead, a complete video image is represented by a single field frame wherein a frame of the video signal in the progressive format includes consecutive lines.

There exists a demand from users of each of these display devices for the capability of displaying video signals of the other format. For example, users of personal computers desire the capability of displaying video signals of the type typically received and displayed by television receivers. To provide such a capability requires converting video signals of one format into the other.

Conventional converters for converting video signals of interlace format into video signals of progressive format require four inter-field converters. This method of conversion is very hardware intensive and requires large amounts of memory. These conventional converters, however, use the four inter-field converter system since this system suppresses line flicker while keeping motion of a displayed image clear.

SUMMARY OF THE INVENTION

One object of the present invention is to provide a converter and method for converting video signals of interlace format to video signals of progressive format which suppress line flicker and maintains clarity of image motion.

Another object of the present invention is to provide a converter and method for converting video signals of interlace format to video signals of progressive format which reduces the hardware and memory requirements as compared to conventional devices and methods.

A further objective of the present invention is to provide a converter and method for converting video signals of interlace format to video signals of progressive format which use intra-field conversion without detracting from display quality.

An additional objective of the present invention is to provide a converter and method for converting video signals of interlace format to video signals of progressive format which use intra-field conversion and suppress line flicker while keeping motion of displayed images clear.

A further objective of the present invention is to provide a converter and method for converting video signals of interlace format to video signals of progressive format which achieve the above objectives using adaptive temporal filtering.

A further objective of the present invention is to provide a converter and method for converting video signals of an interlace format to video signals of a progressive format which achieve the above objectives using temporal expansion and adaptive temporal filtering.

A further objective of the present invention is to provide a converter and method for converting video signals of interlace format to video signals of progressive format which use spatial expansion and adaptive temporal filtering.

An additional objective of the present invention is to provide a converter for converting video signals of interlace format to video signals of progressive format which utilize temporal expansion, spatial expansion, and adaptive temporal filtering.

These and other objectives are achieved by providing a converter for converting video signals of an interlace format to video signals of a progressive format, comprising:

- an intra-field converting means for intra-field converting a video signal of said interlace format into a video signal of said progressive format; and
- an adaptive temporal filtering means for temporally filtering said video signal of said progressive format such that when said video signal of said progressive format represents moving images, a lesser degree of temporal filtering is performed, and when said video signal represents a stationary image a greater degree of temporal filtering is performed.

These and other objectives are also achieved by providing a method for converting video signals of an interlace format to video signals of a progressive format, comprising:

(a) intra-field converting a video signal of said interlace format into a video signal of said progressive format; and (b) temporally filtering said video signal of said progressive format such that when said video signal of said progressive format represents moving images, a lesser degree of temporal filtering is performed, and when said video signal represents a stationary image a greater degree of temporal filtering is performed.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DETAILED DESCRIPTION OF THE PREFERRED EMBODIMENTS

Figure 1:
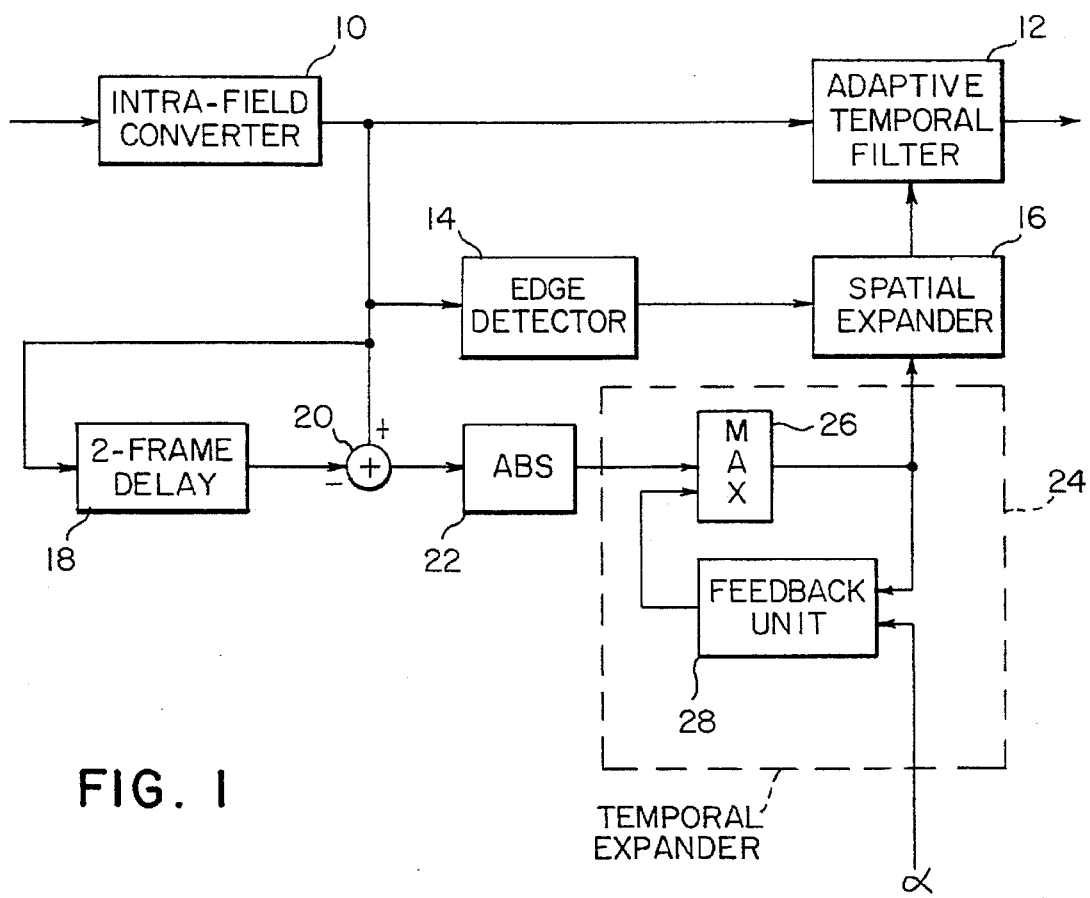
FIG. 1 illustrates a first embodiment of the converter according to the present invention.

FIG. 1 illustrates a first embodiment of the converter according to the present invention. In FIG. 1 an intra-field converter 10 receives at its input a video signal of the interlace format, converts this video signal, and outputs a video signal of the progressive format. A 2-frame delay 18 delays the output of the intra-field converter 10 by two frames and outputs the result to a subtractor 20. The subtractor 20 also receives the output of the intra-field converter 10, and subtracts the output of the 2-frame delay 18 from the output of the intra-field converter 10 to produce a difference signal. An absolute value circuit 22 is connected to the output of the subtractor 20, and outputs an absolute value of the difference signal to a temporal expander 24.

The temporal expander 24 includes a maximum value circuit 26 and a feedback unit 28. The maximum value circuit 26 selects the maximum value of the absolute difference signal output from the absolute value circuit 22 and a feedback value output from feedback unit 28 as a temporally expanded difference value. The feedback unit generates the feedback value from the output of the maximum value circuit 26 and a temporal expansion parameter $\alpha$.

An edge detector 14 detects an edge of an image represented by the video signal of the progressive format output from intra-field converter 10. A spatial expander 16 receives the output of edge detector 14, and based on the edge detection result, spatially expands the temporally expanded difference value to produce a spatially and temporally expanded difference value. An adaptive temporal filter 12 receives the spatially and temporally expanded difference value from the spatial expander 16 and the video signal of the progressive format from the intra-field converter 10, and performs temporal filtering of the video signal of the progressive format based on the spatially and temporally expanded difference value to produce a temporally filtered video signal of the progressive format. The operation of this embodiment is described in detail below.

Figure 2:
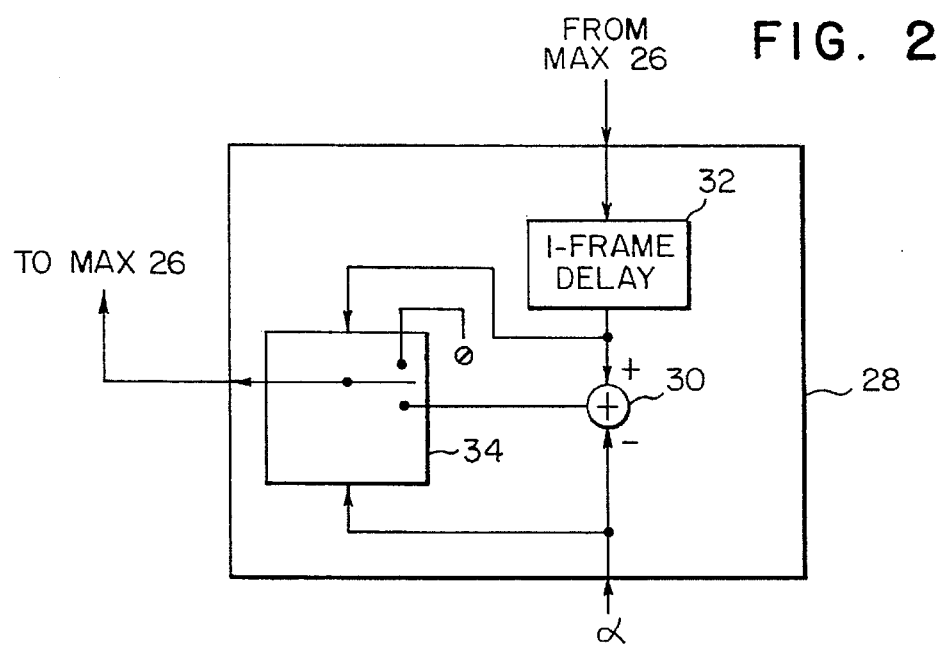
FIG. 2 is a block diagram of an embodiment of the feedback unit of the present invention.

FIG. 2 is a detailed illustration of the feedback unit 28. The feedback unit 28 includes a subtractor 30, a 1-frame delay 32, and a selection switch 34. The 1-frame delay receives the output of the maximum value circuit 26, and delays the output by one frame period. The selection switch 34 receives the output of 1-frame delay 32 and the temporal expansion parameter $\alpha$ as selection control signals. The subtractor 30 subtracts the temporal expansion parameter $\alpha$ from the output of the 1-frame delay 32. The selection circuit 34 receives the output of the subtractor 30 and a constant value as selection inputs. In this particular embodiment, the constant value is zero, but a different constant could be chosen depending on desired performance. The selection switch 34 selects one of the output of the 1-frame delay 32 and the constant voltage as the feedback value based on the selection control signals. The operation of the feedback unit 28 is discussed in detail below.

FIGS. 3–6 and 9–10 illustrate other embodiments of the present invention. Since these embodiments include many of the same elements described with respect to the embodiment illustrated in FIG. 1, the description of these elements will not be repeated. Instead, the differences between each embodiment and the embodiment illustrated in FIG. 1 will be described.

Figure 3:
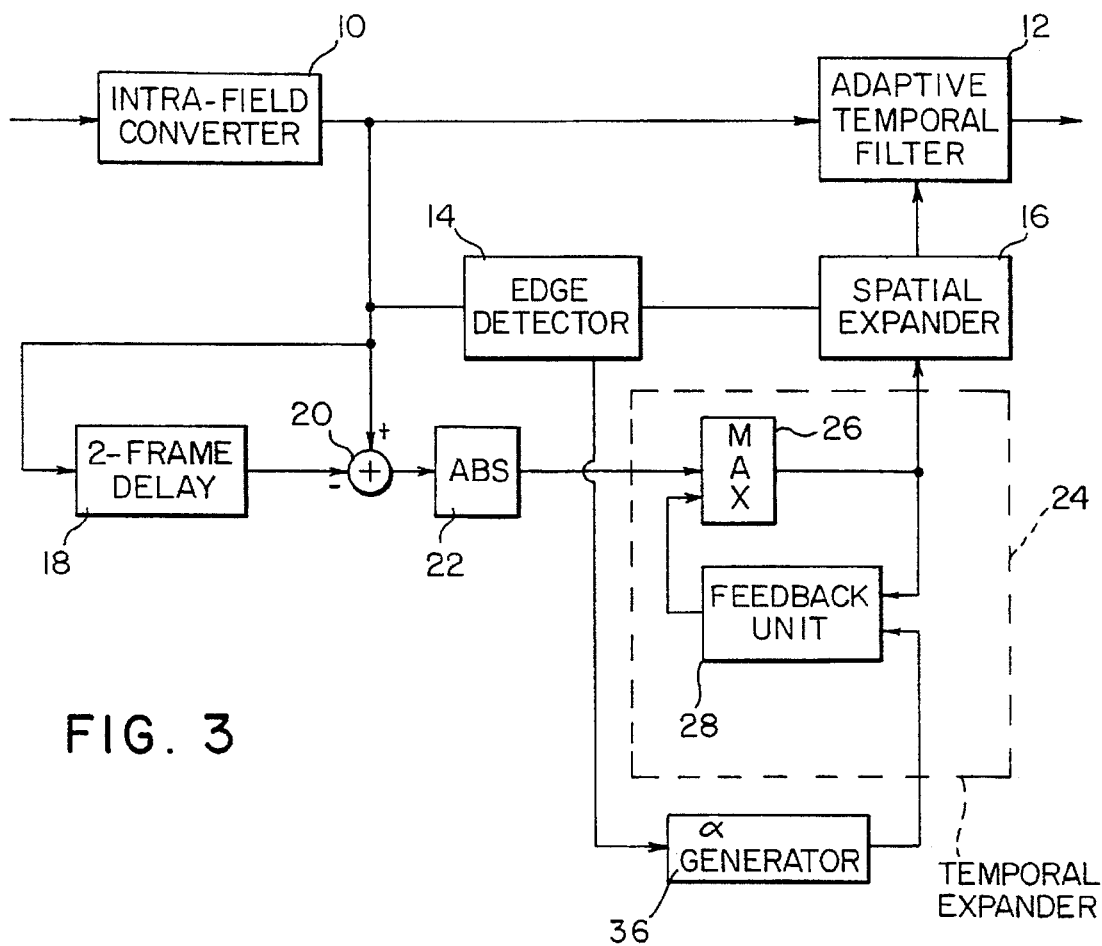
FIG. 3 illustrates another embodiment of the converter according to the present invention.

FIG. 3 illustrates another embodiment of the converter according to the present invention. The embodiment of FIG. 3 differs from the embodiment of FIG. 1 by further including a temporal expansion parameter generator 36. The temporal expansion parameter generator 36 receives an edge detection value generated by the edge detector 14, and generates the temporal expansion parameter $\alpha$ therefrom. The operation of this embodiment is discussed in detail below.

Figure 4:
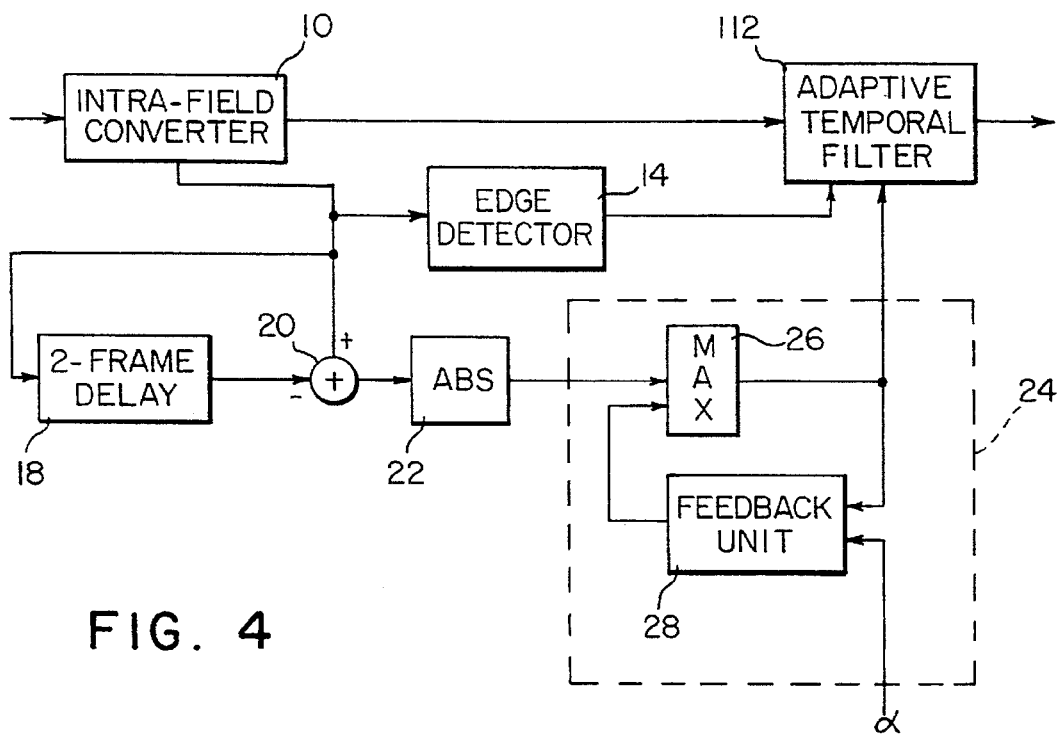
FIG. 4 illustrates another embodiment of the converter according to the present invention.

FIG. 4 illustrates a further embodiment of the converter according to the present invention. This embodiment differs from the embodiment of FIG. 1 in that the spatial expander 16 has been eliminated, and the adaptive temporal filter 12 of FIG. 1 has been replaced with an adaptive temporal filter 112. Furthermore, the adaptive temporal filter 112 directly receives the temporally expanded difference value output from the temporal expander 24. Additionally, the adaptive temporal filter 112 receives the output of the edge detector 14.

The adaptive temporal filter 112 temporally filters the video signal of the progressive format output from intra-field converter 10 based on the output of the edge detector 14 and the temporally expanded difference value to produce a temporally filtered video signal of the progressive format. In this manner, the embodiment of FIG. 4 has eliminated the spatial expander 16, and further reduced the hardware requirements of the converter according to the present invention. The operation of this embodiment is described in detail below.

The embodiment of FIG. 4 can be modified to include the temporal expansion parameter generator 36 of FIG. 3. This modification would entail connecting the edge detector 14 to the temporal expansion parameter generator 36. The output of the temporal expansion parameter generator 36 would then be connected to the feedback unit 28 of the temporal expander 24. A figure illustrating this embodiment has not been provided since the structure of this embodiment is known from FIGS. 3 and 4. The operation of this embodiment is discussed in detail below.

Figure 5:
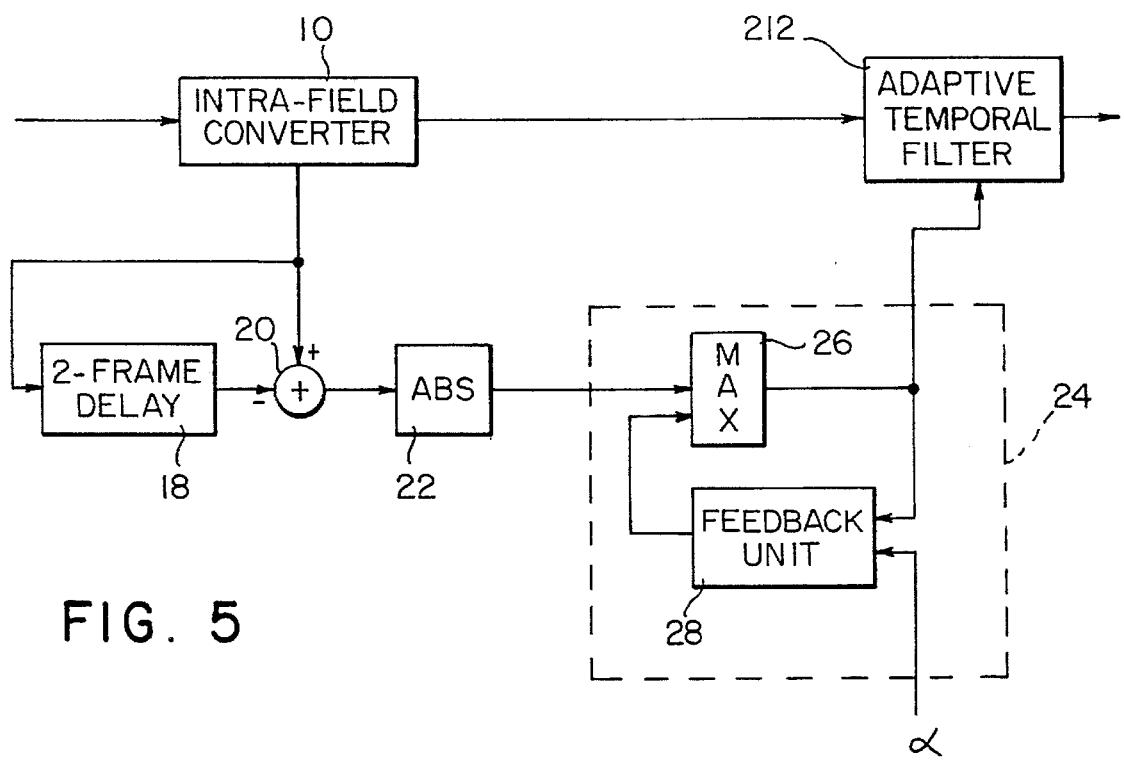
FIG. 5 illustrates another embodiment of the converter according to the present invention.

FIG. 5 illustrates a further embodiment of the converter according to the present invention. This embodiment differs from the embodiment of FIG. 1 in that both the edge detector 14 and spatial expander 16 have been eliminated, and the adaptive temporal filter 12 has been replaced with an adaptive temporal filter 212. The adaptive temporal filter 212 directly receives the temporally expanded difference value output from the temporal expander 24. The adaptive temporal filter 212 also receives the video signal of the progressive format output by intra-field converter 10, and temporally filters this video signal based on the temporally expanded difference value to produce a temporally filtered video signal of the progressive format. The operation of this embodiment is discussed in detail below.

The embodiment of FIG. 5 can be modified to include the temporal expansion parameter generator 36 of FIG. 3. This modification would entail connecting the edge detector 14 to the output of the intra-field converter 10, and connecting the edge detector 14 to the temporal expansion parameter generator 36. The output of the temporal expansion parameter generator 36 would then be connected to the feedback unit 28 of the temporal expander 24. A figure illustrating this embodiment has not been provided since the structure of this embodiment is known from FIGS. 3 and 5. The operation of this embodiment is discussed in detail below.

Figure 6:
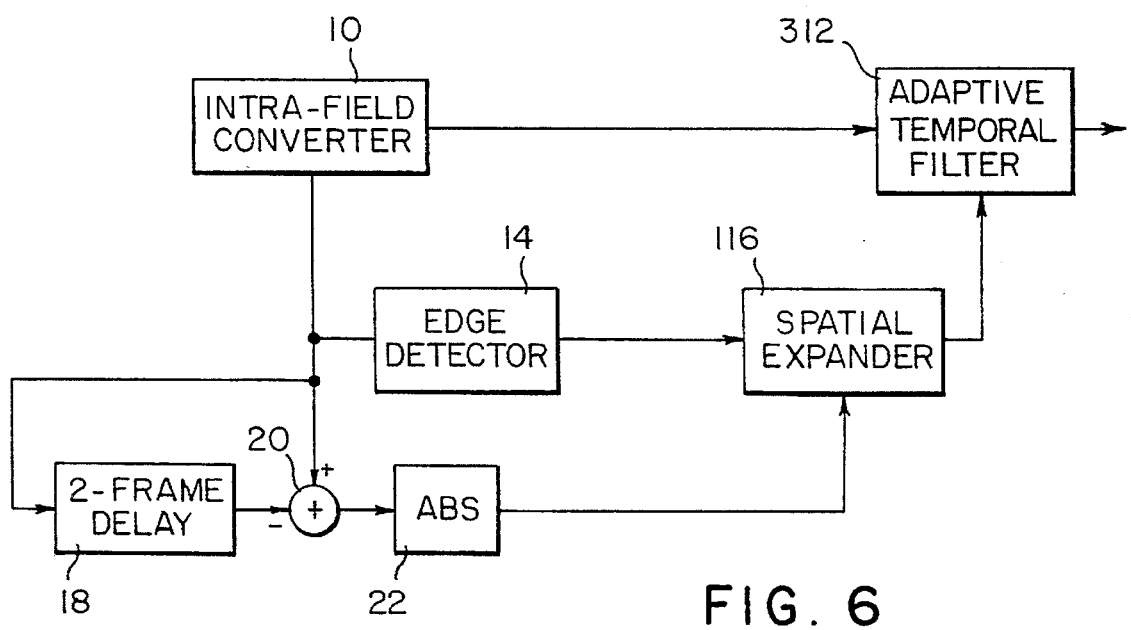
FIG. 6 illustrates another embodiment of the converter according to the present invention.

FIG. 6 illustrates an additional embodiment of the converter according to the present invention. This embodiment differs from the embodiment of FIG. 1 in that the temporal expander 24 has been eliminated. Furthermore, the adaptive filter 12 and the spatial expander 16 have been replaced by an adaptive temporal filter 312 and a spatial expander 116, respectively.

The spatial expander 116 receives the output of the edge detector 14 and the absolute difference value output from absolute value circuit 22. Based on these outputs, the spatial expander 116 produces a spatially expanded difference value. The adaptive temporal filter 312 receives the spatially expanded difference value and the video signal of the progressive format output by the intra-field converter 10. The adaptive temporal filter 312 temporally filters the video signal of the progressive format based on the spatially expanded difference value to produce a temporally filtered video signal of the progressive format. The operation of this embodiment is described in detail below.

Figure 9:
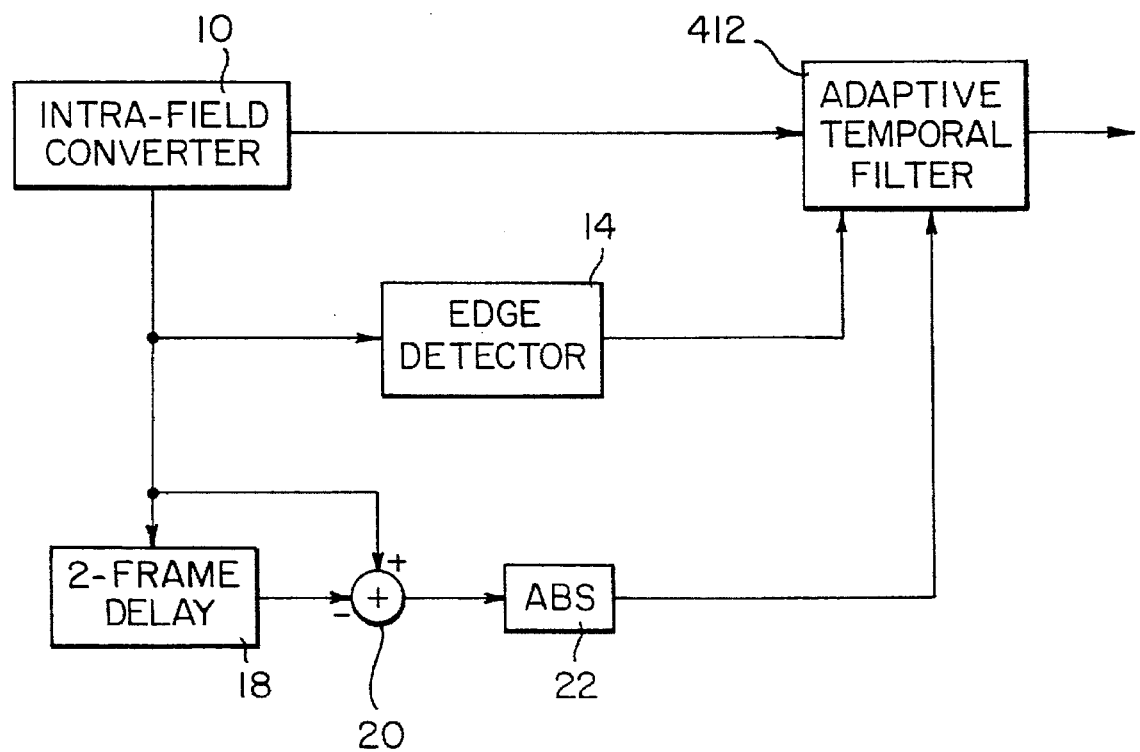
FIG. 9 illustrates another embodiment of the converter according to the present invention.

FIG. 9 illustrates another embodiment of the converter according to the present invention. This embodiment differs from the embodiment of FIG. 1 in that the temporal expander 24 and the spatial expander 16 have been eliminated, and the adaptive temporal filter 12 has been replaced by an adaptive temporal filter 412. The adaptive temporal filter 412 directly receives the output of the edge detector 14 and the absolute difference value output by the absolute value circuit 22. The adaptive temporal filter 412 temporally filters the video signal of the progressive format based on the output of the edge detector 14 and the absolute difference value to produce a temporally filtered video signal of the progressive format. The operation of this embodiment is described in detail below.

Figure 10:
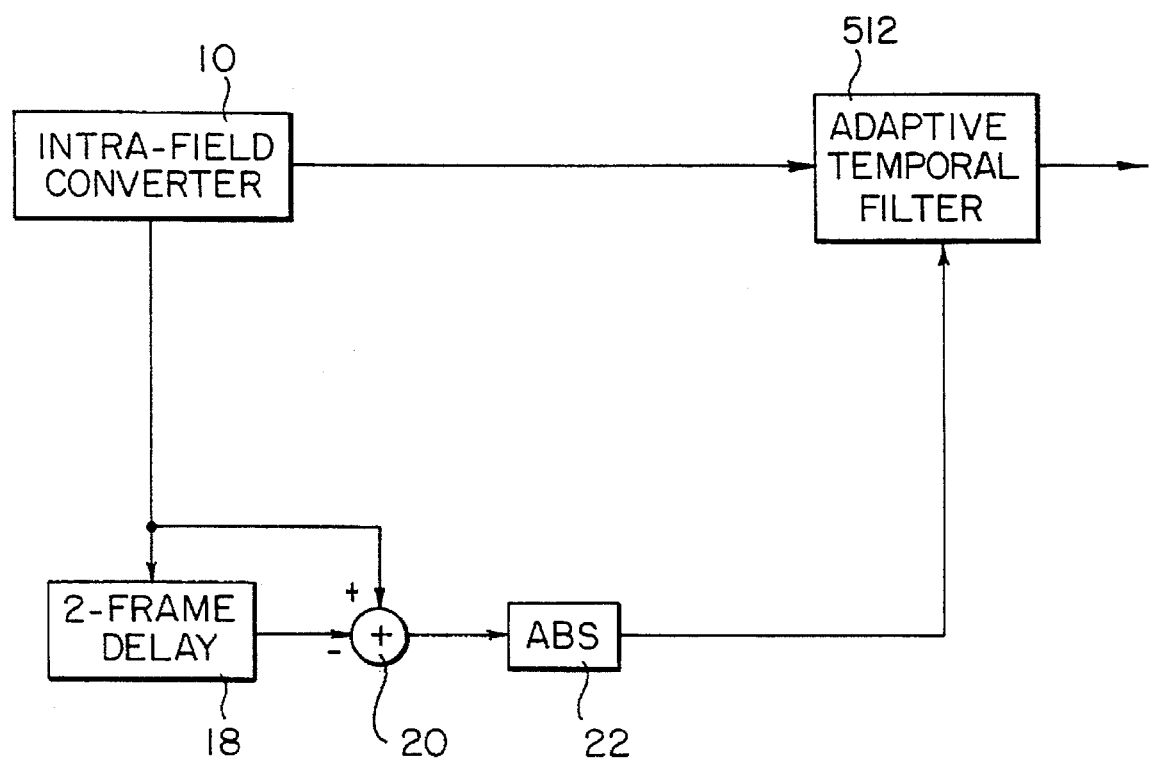
FIG. 10 illustrates another embodiment of the converter according to the present invention.

FIG. 10 illustrates another embodiment of the converter according to the present invention. This embodiment differs from the embodiment of FIG. 1 in that the edge detector 14, the temporal expander 24, and the spatial expander 16 have been eliminated, and the adaptive temporal filter 12 has been replaced by an adaptive temporal filter 512. The adaptive temporal filter 512 directly receives the absolute difference value output by the absolute value circuit 22. The adaptive temporal filter 512 temporally filters the video signal of the progressive format based on the absolute difference value to produce a temporally filtered video signal of the progressive format. The operation of this embodiment is described in detail below.

OPERATION OF THE PREFERRED EMBODIMENTS

First Embodiment

The following is a detailed description of the operation of the converter illustrated in FIG. 1. As discussed in the Background of the Invention, a video signal of the interlace format includes, in one typical embodiment, frames having 1920 horizontal samples per line and 1080 lines. Accordingly, a field of the interlace format includes 1920 horizontal samples per line and 540 lines. Also as discussed in the Background of the Invention a frame of a video signal in the progressive format includes 1280 horizontal samples per line and 720 lines.

Intra-Field Conversion

The intra-field converter 10 converts the 1920×540 field pictures of a video signal in the interlace format to 1280×720 progressive frame pictures. The intra-field converter 10 performs this conversion by changing the horizontal sampling rate by a factor of 2/3 and changing the number of lines by a factor 4/3. For the horizontal sampling rate (the horizontal direction), the video signals of the interlace format are up-sampled by a factor of 2 by inserting a sample value of 0 between the original samples. A band-limiting filter (not shown) included in the intra-field converter 10 filters the up-sampled signal, and then a decimator (not shown) also included in the intra-field converter 10 decimates the up-sampled and filtered signal by a factor of 3.

The intra-field converter 10 increases the number of lines (the vertical direction) by a factor of 4 by inserting three lines having samples of value 0 between the original lines of the video signal in the interlace format. The intra-field converter 10 filters the video signal with the increased number of lines using a bandwidth-limiting filter, and decimates the output of the filtered signal by a factor of 3.

In this manner, fields of the video signal in the interlace format are converted to frames of a video signal in the progressive format.

Unfortunately, however, the images produced from the video signal of the progressive format output by the intra-field converter 10 have noticeable line flicker, especially around stationary lines tilted slightly from the horizontal direction. The inventors have devised inter-field filtering techniques, described in detail below, which suppress the line flicker in the video signal of the progressive format while maintaining the clarity of moving images represented by the video signal of the progressive format. In the preferred embodiment an inter-frame filtering technique is utilized; inter-frame filtering being a type of inter-field filtering.

Adaptive Temporal Filtering

The inter-frame filtering discussed above is performed by the adaptive temporal filter 12 illustrated in FIG. 1. The adaptive temporal filter 12 performs inter-frame filtering according to the following expression:

$$q_t(x,y)=a \cdot p_t(x,y)+b \cdot (p_{t-1}(x,y)+p_{t+1}(x,y)) \quad (1)$$

where $q_t(x,y)$: temporally filtered pixel value in the frame t at the location (x,y);

$p_t(x,y)$: pixel value in the frame t at the location (x,y);

$p_{t-1}(x,y)$: pixel value in the frame t−1 at the location (x,y);

$p_{t+1}(x,y)$: pixel value in the frame t+1 at the location (x,y); and

"a" and "b" are temporal coefficients, the determination of which is described in detail below.

In this embodiment, the temporal coefficients "a" and "b" are determined according to motion detection which has been temporally and spatially expanded. The 2-frame delay 18 delays the video signal of the progressive format output by the inter-field converter 10 by 2 frames. The subtractor 20 subtracts the delayed video signal output by the 2-frame delay 18 from the video signal of the progressive format output by the intra-field converter 10 to produce a difference signal. The absolute value circuit 22 produces an absolute value of the difference value. The expression below describes the operation of the 2-frame delay 18, subtractor 20, and absolute value circuit 22:

$$d_t(x,y)=|p_{t-1}(x,y)-p_{t+1}(x,y)| \quad (2)$$

The variable $d_t(x,y)$ is the absolute difference value which represents an accurate measurement of the "degree of motion" in the images represented by the video signal of the progressive format. A two frame delay is used so that formerly even fields of the interlace video signal are compared to even fields, while formerly odd fields of the interlace video signal are compared to odd fields.

As discussed above, this motion detection undergoes both temporal and spatial expansion. The temporal expansion is performed by temporal expander 24. Since the motion detection performed by the 2-frame delay 18, subtractor 20, and absolute value circuit 22 detects motion between two frames separated from an intermediate frame, the motion detection can fail to detect lesser amounts of motion which only occur between adjacent frames. Accordingly, temporal expansion is performed to further refine the accuracy of the motion detection to account for the motion between adjacent frames.

Temporal Expansion

The temporal expander 24 includes a maximum value circuit 26 which determines a temporally expanded difference value $d_t'(x,y)$ as the maximum value of the absolute difference value $d_t(x,y)$ and a feedback value $c_t(x,y)$ output by the feedback unit 28. The operation of the maximum value circuit 26 is illustrated by the expression below:

$$d_t'(x,y) = \max(d_t(x,y), c_t(x,y)) \quad (3)$$

Next the generation of the feedback value $c_t(x,y)$ by feedback unit 28 will be described with respect to FIG. 2. The feedback unit 28 receives the temporally expanded difference value $d_t'(x,y)$ output from the maximum value circuit 26 and the temporal expansion parameter $\alpha$. The temporal expansion parameter $\alpha$ may be an empirically determined constant such as in the present embodiment, or may be determined based on other operational parameters of the converter such as discussed below with respect to the alternative embodiments. Determining the temporal expansion parameter experimentally depends on the desired operating characteristics and is easily within the purview of one skilled in the art.

The 1-frame delay 32 delays the temporally expanded difference value $d_t'(x,y)$ to produce a delayed temporally expanded difference value $d_{t-1}'(x,y)$. The subtractor 30 subtracts the temporal expansion parameter $\alpha$ from the delayed temporally expanded difference value $d_{t-1}'(x,y)$. The result of this subtraction is sent to selection switch 34.

The selection switch 34 selects one of the output of the subtractor 30 and a constant value as the feedback value $c_t(x,y)$ based on the temporal expansion parameter $\alpha$ and the delayed temporally expanded difference value $d_{t-1}'(x,y)$. In this embodiment, the constant value is a 0 value in FIG. 2.

The selection switch 34 selects the constant value when the delayed temporally expanded difference value $d_{t-1}'(x,y)$ is less than or equal to the temporal expansion parameter $\alpha$. The selection switch selects the output of subtractor 30 when the delayed temporally expanded difference value $d_{t-1}'(x,y)$ is greater than the temporal expansion parameter $\alpha$. The operation of the selection switch 34 is represented by the expression below:

$$c_t(x,y) = \begin{cases} d_{t-1}'(x,y) - \alpha & (d_{t-1}'(x,y) > \alpha) \\ 0 & (d_{t-1}'(x,y) \leq \alpha) \end{cases} \quad (4)$$

The temporal expansion parameter serves to decay the previous temporally expanded difference value, and prevent a large motion detection for one frame from carrying over to subsequent frames where the amount of motion may be much smaller. Thus, this decay can also result, eventually, in the feedback value being set to zero.

To further increase the accuracy of the adaptive temporal filtering performed by the adaptive temporal filter 12, the temporally expanded difference value $d_t'(x,y)$, which indicates the degree of motion, is spatially expanded to further refine the measurement of the degree of motion. Specifically, the spatial expansion process identifies the greatest amount of motion within a window of pixels, and in this manner can suppress erroneous modification of the degree of motion by the temporal expander 24.

Spatial Expansion

Figure 7:
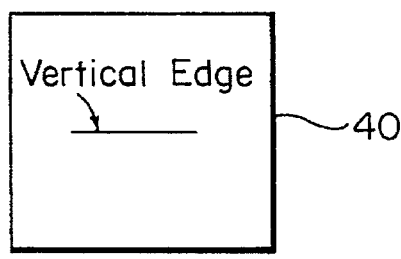
FIG. 7 is an illustration of a vertical edge of an image.
Figure 8:
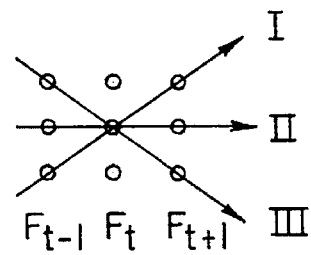
FIG. 8 illustrates a method of determining an edge of an image.

Next the spatial expansion process will be described. The edge detector 14 receives the video signal of the progressive format output by intra-field converter 10. The edge detector 14 detects vertical edges of the images represented by the video signal of the progressive format. FIG. 7 illustrates a display screen 40 which displays an image having a vertical edge.

There are several methods of performing vertical edge detection. One such method involves the use of a Sobel operator. A Sobel operator such as indicated below may be used to detect vertical edges.

$$\text{Sobel:} \begin{bmatrix} -1 & -2 & -1 \\ 0 & 0 & 0 \\ 1 & 2 & 1 \end{bmatrix} \quad (5)$$

The use of Sobel operators is well known, and any known Sobel operator may be used.

The sum computed using either the first described vertical edge detection method or the Sobel operator is compared with an empirically determined threshold value to determine whether the pixel being tested is on an edge or not. In the preferred embodiment, a Sobel operator is used, however, the vertical edge detection method is not limited to either of above described methods of edge detection. Instead, any well known vertical edge detection method may be used. The edge detector 14 outputs the edge detection result (edge or no edge) to the spatial expander 16.

The spatial expander 16 determines the maximum one of a plurality of temporally expanded difference values $d_t'(x,y)$ in a predetermined area $S(x,y)$ surrounding the pixel to which temporal filtering is applied. The expression below illustrates the operation of the spatial expander 16 which results in the production of a spatially and temporally expanded difference value $d_t''(x,y)$.

$$d_t''(x,y) = _{(x',y') \in S(x,y)}(d_t'(x',y')) \quad (6)$$

The shape of the area $S(x,y)$ is determined based on the vertical edge detection result output by the edge detector 14. For example, when the edge detector 14 outputs a "no edge" detection result, the area $S(x,y)$ is a rectangular area with five pixels in the horizontal direction and three pixels in the vertical direction centered on the pixel to which adaptive temporal filtering is applied. When the edge detector 14, however, outputs an "edge detected" result, the spatial expander 16 changes the area $S(x,y)$ to an area which include five pixels on the same line in the horizontal direction and is centered at the pixel to which adaptive temporal filtering is applied. The area of $S(x,y)$ is changed to more precisely spatially expand the temporally expanded difference value. Therefore, when a vertical edge is detected, the area of spatial expansion is changed to a smaller size. This decreases the probability of obtaining a large spatially expanded value and relaxes the criteria for detecting motion.

Determination of Temporal Coefficients

The spatially and temporally expanded difference value $d_r''(x,y)$ is then output by the spatial expander 16 to the adaptive temporal filter 12. As discussed, the adaptive temporal filter 12 then determines the temporal coefficients "a" and "b" based on the spatially and temporally expanded difference value $d_r''(x,y)$. One method for determining the coefficients "a" and "b" is shown by the expressions below:

$$\text{For } d_r''(x, y) \leq T_1: \left\{ \begin{array}{c} a = 1/2 \\ b = 1/4 \end{array} \right\}$$

$$\text{For } T_1 < d_r''(x, y) < T_2: \left\{ \begin{array}{c} a = 1/2 + r(d_r''(x, y) - T_1) \\ b = \frac{1}{2}\left(\frac{1}{2} - a\right) \end{array} \right\} \quad (7)$$

$$\text{For } T_2 \leq d_r''(x, y): \left\{ \begin{array}{c} a = 1 \\ b = 0 \end{array} \right\}$$

where $T_1$ and $T_2$ are threshold values and r is determined according to the following expression:

$$r = \frac{1}{2(T_2 - T_1)} \quad (8)$$

The threshold values $T_1$ and $T_2$ may be constants easily determined empirically by one skilled in the art.

As an alternative, the temporal coefficients "a" and "b" may be addressed from a data map stored in, for example, a ROM based on the spatially and temporally expanded difference value $d_r''(x,y)$. The data maps discussed above with respect to $T_1$, $T_2$, "a", and "b" are easily determined empirically by one skilled in the art and stored in the ROM.

The embodiment of FIG. 1 may be a signal processor comprising a CPU, ROM, and RAM. Alternatively, the embodiment of FIG. 1 may consist of equivalent hardware components well known to those skilled in the art such as gate arrays, TTL ICs and CMOS ICs.

As expressions (7) and (1) demonstrate, the greater the degree of motion detected, the lesser the amount of temporal filtering. In other words, as the degree of motion increases, temporal coefficient "b" decreases and temporal coefficient "a" increases. Viewed another way, as the spatially and temporally expanded difference value $d_r''(x,y)$ increases, the amount of temporal filtering decreases. When the degree of motion is less than or equal to threshold $T_1$, the video signal of the progressive format is considered to represent an essentially stationary image at that point.

The temporal expansion parameter α also effects the amount of temporal filtering. As expressions (3), (4), (6), and (7) demonstrate, the greater the temporal expansion parameter α, the greater the degree of temporal filtering performed.

Next the operation of the embodiments illustrated in FIGS. 3–6 and 9–10 will be described. Since these embodiments include many of the same elements as described above with respect to the embodiment illustrated in FIG. 1, a description of the operation of these elements will not be repeated. Instead, the operational differences between each embodiment and the embodiment of FIG. 1 will be described. Likewise, the implementation of these elements is as described above with respect to FIG. 1. Preferably, however, the embodiments of the present invention operate in the digital domain.

Second Embodiment

FIG. 3 differs from FIG. 1 in that the temporal expansion parameter generator 36 generates the temporal expansion parameter α used by temporal expander 24. The temporal expansion parameter generator 36 receives the edge detection value determined by edge detector 14 before thresholding, and uses that value in a function to generate the temporal expansion parameter α.

For instance, the temporal expansion parameter generator 36 could generate the temporal expansion parameter α according to the following expression:

$$\alpha = k \text{ (edge detection value)} \quad (9)$$

where k is an empirically determined scaler multiple. In this embodiment, the temporal expansion parameter generator 36 may be an amplifier with a gain of $k_1$, or may be incorporated as part of the CPU, ROM, and RAM configuration discussed above with respect to FIG. 1.

Alternatively, the temporal expansion parameter generator 36 could include, for example, a ROM which stores a temporal expansion parameter look-up table. The temporal expansion parameter generator 36 reads the temporal expansion parameter α from the look-up table using the edge detection value received from edge detector 14 as an address.

As with the embodiment of FIG. 1, the greater the degree of motion detected, the lesser the amount of temporal filtering.

Third Embodiment

Next the operation of the embodiment illustrated in FIG. 4 is described. The embodiment of FIG. 4 differs from FIG. 1 in that the spatial expander 16 has been eliminated, and the adaptive temporal filter 12 has been replaced with adaptive temporal filter 112. The adaptive temporal filter 112 receives the edge/no-edge output result from the edge detector 14 and the temporally expanded difference value from temporal expander 24, and performs adaptive temporal filtering of the video signal of the progressive format based thereon.

Specifically, the adaptive temporal filter 112 performs adaptive temporal filtering according to expression (1), and determines temporal coefficients "a" and "b" according to the following expression:

$$\text{For } d_t'(x, y) \leq T_1: \left\{ \begin{array}{c} a = 1/2 \\ b = 1/4 \end{array} \right\}$$

$$\text{For } T_1 < d_t'(x, y) < T_2: \left\{ \begin{array}{c} a = 1/2 + r(d_t'(x, y) - T_1) \\ b = \frac{1}{2}\left(\frac{1}{2} - a\right) \end{array} \right\} \quad (10)$$

$$\text{For } T_2 \leq d_t'(x, y): \left\{ \begin{array}{c} a = 1 \\ b = 0 \end{array} \right\}$$

where $T_1$ and $T_2$ are threshold values and r is determined by expression (8).

In this embodiment the threshold values $T_1$ and $T_2$ are determined in accordance with the edge/no-edge output result from the edge detector 14. For instance, when an edge is detected, $T_1$ is set to 12 and $T_2$ is set to 48. When an edge is not detected $T_1$ is set to 4 and $T_2$ is set to 12. These values are examples and this embodiment is not limited to the values described. Other values can be easily determined by one skilled in the art based on desired operational characteristics.

In an alternative embodiment, the adaptive temporal filter 112 includes a data map stored in ROM which determines thresholds $T_1$ and $T_2$ based on the vertical edge detection value determined by the edge detector 14 before thresholding.

As a further alternative, the temporal coefficients "a" and "b" may be addressed from a data map stored in, for example, a ROM based on the temporally expanded difference value $d_t'(x,y)$. The data maps discussed above with respect to $T_1$, $T_2$, "a", and "b" are easily determined empirically by one skilled in the art and stored in the ROM.

The embodiment of FIG. 4 can be further modified by adding a temporal expansion generator 36. Since the operation of the temporal expansion generator 36 was discussed above with respect to FIG. 3, a description of the operation thereof will not be repeated.

As discussed above with respect to the operation of the embodiment in FIG. 1, the converter of FIG. 4 performs greater temporal filtering when a stationary image is ascertained. In this embodiment, a stationary image is much more likely to be determined when the edge detector 14 determines the presence of a vertical edge.

Fourth Embodiment

Next the operation of the embodiment illustrated in FIG. 5 will be described. This embodiment differs from the embodiment of FIG. 1 in that both the edge detector 14 and spatial expander 16 have been eliminated, and the adaptive temporal filter 12 has been replaced with an adaptive temporal filter 212.

The adaptive temporal filter 212 receives the temporally expanded difference value and temporally filters the video signal of the progressive format based thereon. Specifically, the adaptive temporal filter performs temporal filtering in accordance with expression (10) discussed above with respect to the embodiment of FIG. 4. The threshold values $T_1$ and $T_2$, however, do not change based on an edge detection result.

The threshold values $T_1$ and $T_2$ may be constants easily determined empirically by one skilled in the art.

As an alternative, the temporal coefficients "a" and "b" may be addressed from a data map stored in, for example, a ROM based on the temporally expanded difference value $d_t'(x,y)$. The data maps discussed above with respect to $T_1$, $T_2$, "a", and "b" are easily determined empirically by one skilled in the art and stored in the ROM.

As with the embodiment of FIG. 1, the greater the degree of motion detected, the lesser the amount of temporal filtering. Viewed another way, as the temporally expanded difference value $d_t'(x,y)$ increases, the amount of temporal filtering decreases.

Fifth Embodiment

Next the embodiment of FIG. 6 will be described. The embodiment of FIG. 6 differs from the embodiment of FIG. 1 in that the temporal expander 24 has been eliminated, and the spatial expander 16 and the adaptive temporal filter 12 have been replaced by the spatial expander 116 and the adaptive temporal filter 312, respectively.

The spatial expander 116 receives the absolute difference value output by the absolute value circuit 22 and the edge detection result output by the edge detector 14, and generates a spatially expanded difference value based thereon. Specifically, the spatial expander 116 operates in similar manner to the spatial expander 16, except that the operation is performed with respect to the absolute difference value as opposed to the temporally expanded difference value. The spatially expanded difference value is determined according to the following expression:

$$d_s(x,y) = \sum_{(x',y') \in S(x,y)} (d_t(x',y')) \quad (11)$$

The spatial expander 116 changes the area $S(x,y)$ based on the output of the edge detector 14 in the same manner as the spatial expander 16. Thus, a description of this operation will not be repeated here.

The adaptive filter 312 receives the spatially expanded difference value and the video signal of the progressive format, and temporally filters the video signal of the progressive format based on the spatially expanded difference value. Specifically, the adaptive temporal filter performs adaptive temporal filtering in accordance with expression (1), and determines temporal coefficients "a" and "b" in accordance with the following expression:

$$\text{For } d_s(x,y) \leq T_1: \left\{ \begin{array}{l} a = 1/2 \\ b = 1/4 \end{array} \right\} \quad (12)$$

$$\text{For } T_1 < d_s(x,y) < T_2: \left\{ \begin{array}{l} a = 1/2 + r(d_s(x,y) - T_1) \\ b = \frac{1}{2}\left(\frac{1}{2} - a\right) \end{array} \right\}$$

$$\text{For } T_2 \leq d_s(x,y): \left\{ \begin{array}{l} a = 1 \\ b = 0 \end{array} \right\}$$

where $T_1$ and $T_2$ are threshold values and r is determined in accordance with expression (8).

As with the embodiment of FIG. 1, the threshold values $T_1$ and $T_2$ may be constants easily determined empirically by one skilled in the art. Alternatively, the thresholds $T_1$ and $T_2$ may be determined as a function of the spatially expanded difference value $d_s(x,y)$. As a further alternative, the spatially expanded difference value may be used as an address for accessing the thresholds $T_1$ and $T_2$ from a data map stored in, for example, a ROM.

As a further alternative, the temporal coefficients "a" and "b" may be addressed from a data map stored in, for example, a ROM based on the spatially expanded difference value $d_s(x,y)$. The data maps discussed above with respect to $T_1$, $T_2$, "a", and "b" are easily determined empirically by one skilled in the art and stored in the ROM.

As with the embodiment of FIG. 1, the greater the degree of motion detected, the lesser the amount of temporal filtering. Viewed another way, as the spatially expanded difference value $d_s(x,y)$ increases, the amount of temporal filtering decreases.

Sixth Embodiment

Next the operation of the embodiment illustrated in FIG. 9 will be described. The embodiment of FIG. 9 differs from the embodiment of FIG. 1 in that the spatial expander 16 and the temporal expander 24 have been eliminated, and the adaptive temporal filter 12 has been replaced with the adaptive temporal filter 412. The adaptive temporal 412 receives the output of the edge detector 14 and the absolute difference value output by absolute value detector circuit 22. The adaptive temporal filter 412 also receives the video signal of the progressive format output by the intra-field converter 10, and performs temporal filtering of the video signal of the progressive format based on the output of the edge detector 14 and the absolute difference signal.

Specifically, the adaptive temporal filter 412 performs adaptive temporal filtering in accordance with expression (1), and determines temporal coefficients "a" and "b" in accordance with the following expression:

$$\text{For } d_t(x, y) \leq T_1: \left\{ \begin{array}{l} a = 1/2 \\ b = 1/4 \end{array} \right\}$$

$$\text{For } T_1 < d_t(x, y) < T_2: \left\{ \begin{array}{l} a = 1/2 + r \cdot (d_t(x, y) - T_1) \\ b = \frac{1}{2} \cdot \left( \frac{1}{2} - a \right) \end{array} \right\} \quad (13)$$

$$\text{For } T_2 \leq d_t(x, y): \left\{ \begin{array}{l} a = 1 \\ b = 0 \end{array} \right\}$$

where $T_1$ and $T_2$ are threshold values and r is determined in accordance with expression (8).

In this embodiment the threshold values $T_1$ and $T_2$ are determined in accordance with the edge/no-edge output result from the edge detector 14. For instance, when an edge is detected, $T_1$ is set to 12 and $T_2$ is set to 48. When an edge is not detected $T_1$ is set to 4 and $T_2$ is set to 12.

In an alternative embodiment, the adaptive temporal filter 4 includes a data map stored in ROM which determines thresholds $T_1$ and $T_2$ based on the vertical edge detection value determined by the edge detector 14 before thresholding.

Alternatively, the adaptive temporal filter 412 determines the temporal coefficients "a" and "b" based solely on the edge detection value determined by the edge detector 14 before threshold comparison. In this alternative embodiment, the adaptive temporal filter 412 determines temporal coefficients "a" and "b" according to the following expressions:

$$a = (1/\text{edge detection value})k_1 \quad (14)$$

$$b = 0.5(1-a) \quad (15)$$

where $k_1$ is an empirically determined constant.

As with the embodiment of FIG. 1, the greater the degree of motion detected, the lesser the amount of temporal filtering.

Seventh Embodiment

Next the operation of the embodiment illustrated in FIG. 10 will be described. FIG. 10 differs from the embodiment in FIG. 1 in that the edge detector 14, spatial expander 16, and temporal expander 24 have been eliminated, and the adaptive temporal filter 12 has been replaced with adaptive temporal filter 512.

The adaptive temporal filter 512 receives the absolute difference value output by absolute value circuit 22 and the video signal of the progressive format output by the intra-field converter 10. The adaptive temporal filter 512 temporally filters the video signal of the progressive format in accordance with expression (1) and determines temporal filter coefficients "a" and "b" according to expression (13).

In this embodiment, however, the threshold values $T_1$ and $T_2$ are constants easily determined empirically by one skilled in the art.

As an alternative, the temporal coefficients "a" and "b" may be addressed from a data map stored in, for example, a ROM based on the absolute difference value $d_t(x,y)$. The data maps discussed above are easily determined empirically by one skilled in the art and stored in the ROM.

As with the embodiment of FIG. 1, the greater the degree of motion detected, the lesser the amount of temporal filtering. In other words, as the degree of motion increases, temporal coefficient "b" decreases and temporal coefficient "a" increases.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed:

1. A converter for converting video signals of an interlace format to video signals of a progressive format, comprising:

an intra-field converting means for intra-field converting a video signal of said interlace format into a video signal of said progressive format; and an adaptive temporal filtering means for temporally filtering said video signal of said progressive format such that as a degree of image movement in images represented by said video signal of said progressive format increases, a lesser degree of temporal filtering is performed, and said adaptive temporal filtering means determining a progressive pixel value as a function of a first product of a first temporal coefficient and a pixel value of a current frame of said video signal of said progressive format and a second product of a second temporal coefficient and at least one pixel of at least one previous frame of said video signal of said progressive format.

2. The converter of claim 1, wherein said adaptive temporal filtering means performs filtering between successive frames in said progressive format.

3. The converter of claim 1, wherein said intra-field converter changes a horizontal sample rate of each field of said video signal of said interlace format and changes a number of lines of each field of said video signal of said interlace format.

4. The converter of claim 1, further comprising:

edge detecting means for detecting an edge in an image represented by said video signal of said progressive format; and spatial expander means for determining a spatially expanded difference value based on output of said edge detecting means and said video signal of said progressive format; and wherein said adaptive temporal filtering means filters said video signal of said progressive format based on output of said spatial expander means.

5. The converter of claim 4, further comprising:

delay means for delaying said video signal of said progressive format for a predetermined period of time; and a subtractor for subtracting output of said delay means from said video signal of said progressive format to obtain a difference signal; and wherein said spatial expander means determines said spatially expanded difference value from said difference signal.

6. The converter of claim 5, wherein said spatial expander means determines said spatially expanded difference value using a first spatial window when said edge detector means detects an edge and using a second spatial window when said edge detector detects no edge, said first spatial window having a smaller area than said second spatial window.

7. The converter of claim 1, further comprising:

an edge detecting means for detecting an edge in an image represented by said video signal of said progressive format; and a spatial expander means for determining a spatially expanded difference value based on output of said edge detecting means and said video signal of said progressive format; and wherein said adaptive temporal filtering means determines said first and second temporal coefficient based on said spatially expanded difference value.

8. The converter of claim 4, further comprising:

delay means for delaying said video signal of said progressive format for a first predetermined period; and a subtractor for subtracting output of said delay means from said video signal of said progressive format to obtain a difference signal; and wherein said spatial expander means determines said spatially expanded difference value from said difference signal.

9. The converter of claim 8, wherein said spatial expander means determines said spatially expanded difference value using a first spatial window when said edge detector means detects an edge and using a second spatial window when said edge detector detects no edge, said first spatial window having a smaller area than said second spatial window.

10. The converter of claim 1, further comprising:

temporal expander means for temporally expanding said video signal of said progressive format to obtain a temporally expanded difference value; and wherein said adaptive temporal filtering means temporally filters said video signal of said progressive format based on said temporally expanded difference value.

11. The converter of claim 10, further comprising:

first delay means for delaying said video signal of said progressive format for a first predetermined period;

first difference means for subtracting a pixel value of said delayed video signal of said progressive format from a pixel value of said video signal of said progressive format to obtain a difference value; and wherein said temporal expander means determines said temporally expanded difference value based on said difference value.

12. The converter of claim 11, wherein said temporal expander means comprises:

feedback means for delaying said temporally expanded difference value for a second predetermined period, for subtracting a temporal expansion parameter from said delayed temporally expanded difference value, and for selecting one of a first constant and said delayed temporally expanded difference value as a feedback value based on said temporal expansion parameter; and selection means for selecting one of said difference value and said feedback value as said temporally expanded difference value.

13. The converter of claim 11, further comprising:

edge detecting means for detecting an edge in an image represented by said video signal of said progressive format;

temporal expansion parameter determining means for determining a temporal expansion parameter based on output of said edge detecting means such that when an edge is detected a greater temporal expansion parameter is determined than when no edge is detected; and wherein said temporal expander means determines said temporally expanded difference value based on said temporal expansion parameter such that as a value of said temporal expansion parameter increases, said temporally expanded difference value decreases; and wherein said adaptive temporal filtering means performs said temporal filtering based on said temporal expanded difference value such that as said temporal expanded difference value increases, a lesser degree of temporal filtering is performed.

14. The converter of claim 1, further comprising:

temporal expander means for detecting a degree of motion in an image represented by said video signal of said progressive format, and determining a temporally expanded difference value based on said detected degree of motion such that as said detected degree of motion increases, said temporally expanded difference value increases; and wherein said adaptive temporal filtering means performs said temporal filtering based on said temporal expanded difference value such that as said temporal expanded difference value increases, a lesser degree of temporal filtering is performed.

15. The converter of claim 14, wherein said adaptive temporal filter compares said temporally expanded difference value to a first and second threshold, said first threshold being less than said second threshold, performs a first degree of temporal filtering when said temporally expanded difference value is less than or equal to said first threshold, performs a second degree of temporal filtering when said temporally expanded difference value is less than said second threshold but greater than said first threshold, and performs a third degree of temporal filtering when said temporally expanded difference value being greater than or equal to said second threshold, said first degree being greater than said second degree, and said second degree is greater than said third degree.

16. The converter of claim 15, further comprising:

edge detecting means for detecting an edge in an image represented by said video signal of said progressive format; and wherein said temporal adaptive filter determines said first and second threshold based on output of said edge detecting means such that said first and second thresholds are greater when an edge is detected than when no edge is detected.

17. The converter of claim 16, wherein said temporal adaptive filter includes a memory for storing different pairs of said first and second threshold which are addressed based on said output of said edge detecting means.

18. The converter of claim 1, further comprising:

temporal expander means for detecting a degree of motion in an image represented by said video signal of said progressive format, and determining a temporally expanded difference value based on said detected degree of motion such that as said detected degree of motion increases, said temporally expanded difference value increases; and wherein said adaptive temporal filtering means performs said temporal filtering based on said temporal expanded difference value such that as said temporal expanded difference value increases, said first temporal coefficient increases and said second temporal coefficient decreases.

19. The converter of claim 1, further comprising:

first delay means for delaying said video signal of said progressive format for a first predetermined period;

first difference means for subtracting a pixel value of said delayed video signal of said progressive format from a pixel value of said video signal of said progressive format to obtain a difference value;

temporal expander means for temporally expanding said video signal of said progressive format to obtain a temporally expanded difference value, said temporal expander means including, feedback means for delaying said temporally expanded difference value for a second predetermined period, for subtracting a temporal expansion parameter from said delayed temporally expanded difference value, and for selecting one of a first constant and said delayed temporally expanded difference value as a feedback value based on said temporal expansion parameter, and selection means for selecting one of said difference value and said feedback value as said temporally expanded difference value; and wherein said adaptive temporal filtering means determines said first and second temporal coefficients based on said temporally expanded difference value.

20. The converter of claim 1, further comprising:

temporal expander means for detecting a degree of motion in an image represented by said video signal of said progressive format, and determining a temporally expanded difference value based on said detected degree of motion such that as said detected degree of motion increases, said temporally expanded difference value increases;

edge detecting means for detecting an edge in an image represented by said video signal of said progressive format; and spatial expander means for spatially expanding said temporally expanded difference value based on output of said edge detecting means to obtain a spatially and temporally expanded difference value; and wherein said adaptive temporal filtering means performs said temporal filtering based on said spatially and temporally expanded difference value such that as said spatially and temporally expanded difference value increases, a lesser degree of temporal filtering is performed.

21. The converter of claim 1, further comprising:

temporal expander means for temporally expanding said video signal of said progressive format to obtain a temporally expanded difference value; and wherein edge detecting means for detecting an edge in an image represented by said video signal of said progressive format; and spatial expander means for spatially expanding said temporally expanded difference value to obtain a temporally and spatially expanded difference value based on output of said edge detecting means; and wherein said adaptive temporal filtering means temporally filters said video signal of said progressive format based on said temporally and spatially expanded difference value.

22. The converter of claim 1, further comprising:

first delay means for delaying said video signal of said progressive format for a first predetermined period;

first difference means for subtracting a pixel value of said delayed video signal of said progressive format from a pixel value of said video signal of said progressive format to obtain a difference value;

temporal expander means for temporally expanding said video signal of said progressive format to obtain a temporally expanded difference value, said temporal expander means including, feedback means for delaying said temporally expanded difference value for a second predetermined period, for subtracting a temporal expansion parameter from said delayed temporally expanded difference value, and for selecting one of a first constant and said delayed temporally expanded difference value as a feedback value based on said temporal expansion parameter, and selection means for selecting one of said difference value and said feedback value as said temporally expanded difference value;

edge detecting means for detecting an edge in an image represented by said video signal of said progressive format; and spatial expander means for spatially expanding said temporally expanded difference value to obtain a temporally and spatially expanded difference value based on output of said edge detecting means; and wherein said adaptive temporal filtering means temporally filters said video signal of said progressive format based on said temporally and spatially expanded difference value.

23. The converter of claim 1, further comprising:

temporal expander means for detecting a degree of motion in an image represented by said video signal of said progressive format, and determining a temporally expanded difference value based on said detected degree of motion such that as said detected degree of motion increases, said temporally expanded difference value increases;

edge detecting means for detecting an edge in an image represented by said video signal of said progressive format; and spatial expander means for spatially expanding said temporally expanded difference value based on output of said edge detecting means to obtain a spatially and temporally expanded difference value; and wherein said adaptive filtering means determines said first and second temporal coefficients based on said temporally and spatially expanded difference value.

24. A method for converting video signals of an interlace format to video signals of a progressive format, comprising:

(a) intra-field converting a video signal of said interlace format into a video signal of said progressive format; and (b) temporally filtering said video signal of said progressive format such that as a degree of image movement in images represented by said video signal of said progressive format increases, a lesser degree of temporal filtering is performed; wherein said step (b) determines a progressive pixel value as a function of a first product of a first temporal coefficient and a pixel value of a current frame of said video signal of said progressive format and a second product of a second temporal coefficient and at least one pixel of at least one previous frame of said video signal of said progressive format.

25. The method of claim 24, wherein said step (b) performs filtering between successive frames in said progressive format.

26. The method of claim 24, wherein said step (a) includes the steps of:

(a1) changing a horizontal sample rate of each field of said video signal of said interlace format; and (a2) changing a number of lines of each field of said video signals of said interlace format.

27. The method of claim 24, further comprising:
(c) detecting an edge in an image represented by said video signal of said progressive format; and
(d) determining a spatially expanded difference value based on output of said step (c) and said video signal of said progressive format; and wherein
said step (b) filters said video signal of said progressive format based on output of said step (d).

28. The method of claim 27, further comprising:
(e) delaying said video signal of said progressive format for a predetermined period of time; and
(f) subtracting output of said step (e) from said video signal of said progressive format to obtain a difference signal; and wherein
said step (d) determines said spatially expanded difference value from said difference signal.

29. The method of claim 28, wherein said step (d) determines said spatially expanded difference value using a first spatial window when said edge detector means detects an edge and using a second spatial window when said edge detector detects no edge, said first spatial window having a smaller area than said second spatial window.

30. The method of claim 24, further comprising:
(c) detecting an edge in an image represented by said video signal of said progressive format; and
(d) determining a spatially expanded difference value based on output of said step (c) and said video signal of said progressive format; and wherein
said step (b) determines said first and second temporal coefficient based on said spatially expanded difference value.

31. The method of claim 27, further comprising:
(e) delaying said video signal of said progressive format for a first predetermined period; and
(f) subtracting output of said step (e) from said video signal of said progressive format to obtain a difference signal; and wherein
said step (d) determines said spatially expanded difference value from said difference signal.

32. The method of claim 31, wherein said step (d) determines said spatially expanded difference value using a first spatial window when said edge detector means detects an edge and using a second spatial window when said edge detector detects no edge, said first spatial window having a smaller area than said second spatial window.

33. The method of claim 24, further comprising:
(c) temporally expanding said video signal of said progressive format to obtain a temporally expanded difference value; and wherein
said step (b) temporally filters said video signal of said progressive format based on said temporally expanded difference value.

34. The method of claim 33, further comprising:
(d) delaying said video signal of said progressive format for a first predetermined period;
(e) subtracting a pixel value of said delayed video signal of said progressive format from a pixel value of said video signal of said progressive format to obtain a difference value; and wherein
said step (c) determines said temporally expanded difference value based on said difference value.

35. The method of claim 34, wherein said step (c) comprises the steps of:
(C1) delaying said temporally expanded difference value for a second predetermined period;
(C2) subtracting a temporal expansion parameter from output of said step (C1);
(C3) selecting one of a first constant and output of said step (C2) as a feedback value based on said temporal expansion parameter; and
(C4) selecting one of said difference value and said feedback value as said temporally expanded difference value.

36. The method of claim 34, further comprising:
(f) detecting an edge in an image represented by said video signal of said progressive format;
(g) determining a temporal expansion parameter based on output of said step (f) such that when an edge is detected a greater temporal expansion parameter is determined than when no edge is detected; and wherein
said step (c) determines said temporally expanded difference value based on said temporal expansion parameter such that as a value of said temporal expansion parameter increases, said temporally expanded difference value decreases; and wherein
said step (b) performs said temporal filtering based on said temporal expanded difference value such that as said temporal expanded difference value increases, a lesser degree of temporal filtering is performed.

37. The method of claim 24, further comprising:
(c) detecting a degree of motion in an image represented by said video signal of said progressive format;
(d) determining a temporally expanded difference value based on said detected degree of motion such that as said detected degree of motion increases, said temporally expanded difference value increases; and wherein
said step (b) performs said temporal filtering based on said temporal expanded difference value such that as said temporal expanded difference value increases, a lesser degree of temporal filtering is performed.

38. The method of claim 37, wherein said step (b) comprises the steps of:
(b1) comparing said temporally expanded difference value to a first and second threshold, said first threshold being less than said second threshold;
(b2) performing a first degree of temporal filtering when said temporally expanded difference value is less than or equal to said first threshold;
(b3) performing a second degree of temporal filtering when said temporally expanded difference value is less than said second threshold but greater than said first threshold; and
performing a third degree of temporal filtering when said temporally expanded difference value being greater than or equal to said second threshold, said first degree being greater than said second degree, and said second degree is greater than said third degree.

39. The method of claim 38, further comprising:
(e) detecting an edge in an image represented by said video signal of said progressive format; and wherein
said step (b) determines said first and second threshold based on output of said step (e) such that said first and second thresholds are greater when an edge is detected than when no edge is detected.

40. The method of claim 39, wherein said step (b) includes the step of (b4) storing different pairs of said first and second threshold which are addressed based on said output of said step (e).

41. The method of claim 24 further comprising:

(c) detecting a degree of motion in an image represented by said video signal of said progressive format;

(d) determining a temporally expanded difference value based on said detected degree of motion such that as said detected degree of motion increases, said temporally expanded difference value increases; and wherein said step (b) performs said temporal filtering based on said temporal expanded difference value such that as said temporal expanded difference value increases, said first temporal coefficient increases and said second temporal coefficient decreases.

42. The method of claim 24, further comprising:

(c) delaying said video signal of said progressive format for a first predetermined period;

(d) subtracting a pixel value of said delayed video signal of said progressive format from a pixel value of said video signal of said progressive format to obtain a difference value;

(e) temporally expanding said video signal of said progressive format to obtain a temporally expanded difference value, said step (e) including the step of,
 (e1) delaying said temporally expanded difference value for a second predetermined period,
 (e2) subtracting a temporal expansion parameter from output of said step (e1),
 (e3) selecting one of a first constant and said output of said step (e2) as a feedback value based on said temporal expansion parameter, and
 (e4) selecting one of said difference value and said feedback value as said temporally expanded difference value; and wherein said step (b) determines said first and second temporal coefficients based on said temporally expanded difference value.

43. The method of claim 24, further comprising:

(c) detecting a degree of motion in an image represented by said video signal of said progressive format;

(d) determining a temporally expanded difference value based on said detected degree of motion such that as said detected degree of motion increases, said temporally expanded difference value increases;

(e) detecting an edge in an image represented by said video signal of said progressive format; and (f) spatially expanding said temporally expanded difference value based on output of said step (e) to obtain a spatially and temporally expanded difference value; and wherein said step (b) performs said temporal filtering based on said spatially and temporally expanded difference value such that as said spatially and temporally expanded difference value increases, a lesser degree of temporal filtering is performed.

44. The method of claim 24, further comprising:

(c) temporally expanding said video signal of said progressive format to obtain a temporally expanded difference value; and wherein (d) detecting an edge in an image represented by said video signal of said progressive format; and (e) spatially expanding said temporally expanded difference value to obtain a temporally and spatially expanded difference value based on output of said step (d); and wherein said step (b) temporally filters said video signal of said progressive format based on said temporally and spatially expanded difference value.

45. The method of claim 24, further comprising:

(c) delaying said video signal of said progressive format for a first predetermined period;

(d) subtracting a pixel value of said delayed video signal of said progressive format from a pixel value of said video signal of said progressive format to obtain a difference value;

(e) temporally expanding said video signal of said progressive format to obtain a temporally expanded difference value, said step (e) including the steps of,
 (e1) delaying said temporally expanded difference value for a second predetermined period,
 (e2) subtracting a temporal expansion parameter from output of said step (e1),
 (e3) selecting one of a first constant and said output of said step (e2) as a feedback value based on said temporal expansion parameter, and
 (e4) selecting one of said difference value and said feedback value as said temporally expanded difference value;

(f) detecting an edge in an image represented by said video signal of said progressive format; and (g) spatially expanding said temporally expanded difference value to obtain a temporally and spatially expanded difference value based on output of said step (f); and wherein said step (b) temporally filters said video signal of said progressive format based on said temporally and spatially expanded difference value.

46. The method of claim 24, further comprising:

(c) detecting a degree of motion in an image represented by said video signal of said progressive format;

(d) determining a temporally expanded difference value based on said detected degree of motion such that as said detected degree of motion increases, said temporally expanded difference value increases;

(e) detecting an edge in an image represented by said video signal of said progressive format; and (f) spatially expanding said temporally expanded difference value based on output of said step (e) to obtain a spatially and temporally expanded difference value; and wherein said step (b) determines said first and second temporal coefficients based on said temporally and spatially expanded difference value.

* * * * *